Oct. 23, 1945.   J. E. PRESTON   2,387,292
ELECTRONIC CONTROL FOR IRONING OR DRYING MACHINERY
Filed March 20, 1941   3 Sheets-Sheet 1

INVENTOR
JOHN E. PRESTON
BY
Hyde and Meyer
ATTORNEYS

Oct. 23, 1945.   J. E. PRESTON   2,387,292
ELECTRONIC CONTROL FOR IRONING OR DRYING MACHINERY
Filed March 20, 1941   3 Sheets-Sheet 2

INVENTOR
JOHN E. PRESTON
BY
Hyde and Meyer
ATTORNEYS

Patented Oct. 23, 1945

2,387,292

UNITED STATES PATENT OFFICE 2,387,292

ELECTRONIC CONTROL FOR IRONING OR DRYING MACHINERY

John E. Preston, Cincinnati, Ohio, assignor to The American Laundry Machinery Company, Norwood, Cincinnati, Ohio, a corporation of Ohio Application March 20, 1941, Serial No. 384,384

12 Claims. (Cl. 38—25)

The invention relates to control means for ironing, pressing, or drying machinery such as is used in commercial laundries, and more particularly to control means, sensitive to the electrical conductivity of the work, as affected by its variable moisture content, for terminating the drying operation. It further relates to additional control means supplementing the moisture sensitive control means, for regulating other significant time intervals in ironing or drying operations.

It is well known to those skilled in the laundering art that there may be a material variation in the time required to complete an ironing or drying operation, or to carry said operation to an end point determined with relation to the amount of residual moisture in the work. Arrival at this desired end point, whether it be complete dryness or any desired deviation therefrom, heretofore has been determined only approximately, based on experience in correlating and estimating the cumulative effect of a number of factors, such as the thickness and texture of the materials, the initial total moisture content, the temperature of the pressing or ironing elements, the desired final moisture content, and other factors neither necessary nor feasible to completely tabulate herein. I have provided positive control means, preferably of electronic form, whereby time intervals may be accurately controlled with relation to the ultimate permissive moisture content, irrespective of any uncertainty as to said variable factors or their cumulative effect.

It is sometimes desirable, in certain laundering operations involving an ironing, pressing, or drying step, not only to reduce the residual moisture content below a certain permissive maximum, but, in addition, to superimpose upon said drying operation a definite additive time increment. An operation of this nature may be performed, for example, on reinforced or specially prepared material, such as shirt collars or cuffs. My timing device, as hereinafter disclosed and claimed, is readily modified to control this additive time increment, the purpose being effected by a suitable supplementary relay in combination with my basic control sensitive to the electrical conductivity of the work as affected by its varying moisture content.

In the time cycle of operation of a conventional commercial ironing or pressing machine it is also sometimes desirable to prevent any application of pressure during a predetermined period after opening of the press. As will hereinafter appear, such an enforced delay, after opening of the press, also allows certain fluid pressure operating mechanisms to evacuate and thereby permit institution of a new cycle. Also, during this period the finished work may be removed from the press and a fresh, unpressed piece of work may be supplied thereto. I have therefore supplemented my timing device with means which interposes, and controls the duration of, a time interval wherein application of pressure is prevented for a definite period between successive operative cycles.

I have also provided adjustable means, supplementing my control system, whereby the operative critical point of said control may be preset to become effective at any desired moisture content within the usual operating range.

The various control elements, either separately or in any desired combination, may be installed as a simple, portable working unit requiring no particular skill to attach or operate. As will appear in the description hereinbelow, a single machine, or a number of machines in tandem, may be equipped with my invention.

One object of my invention therefore is to provide improved means, sensitive to the electrical conductivity of the work as affected by its moisture content, for controlling time cycle operations of ironing or pressing machinery, of the type to be described.

A further object of my invention is to provide electronic tube controlling means for terminating a pressing operation when the moisture content of the work has been reduced to a predetermined value.

A further object of my invention is to provide electronic controlling means, sensitive to the moisture content or electrical conductivity of the fabric, in combination with supplemental means for controlling the period of an additive time cycle beyond a point predetermined by the operation of the moisture-sensitive means aforementioned.

A further object of my invention is to provide control means sensitive to the moisture content or electrical conductivity of the fabric being treated, in combination with means for adapting it to operation at different moisture contents, so that the controlled end point of the cycle may be predetermined for any desired moisture content within a reasonable range.

A further object of my invention is to provide electronic control means sensitive to the moisture content or electrical conductivity of the article, in combination with means for automatically delaying the next pressure application for an additional period after the article has arrived at a predetermined moisture content.

A further object of my invention is to provide means for automatically opening an ironing, pressing, or drying machine at the end of a predetermined time cycle, in combination with further means for automatically delaying pressure application for an additional predetermined period of time.

A further object of my invention is to provide electronic control means, sensitive to the moisture content or electrical conductivity of the work, in combination with means for holding the press in closed position for an additional period after the article has arrived at a predetermined moisture content, and in combination with further means for automatically delaying pressure application for an additional predetermined period of time.

Further objects and advantages will be apparent from a consideration of the present specification in conjunction with the attached drawings illustrating several embodiments of my invention as applied to a conventional ironing machine.

Figure 1:
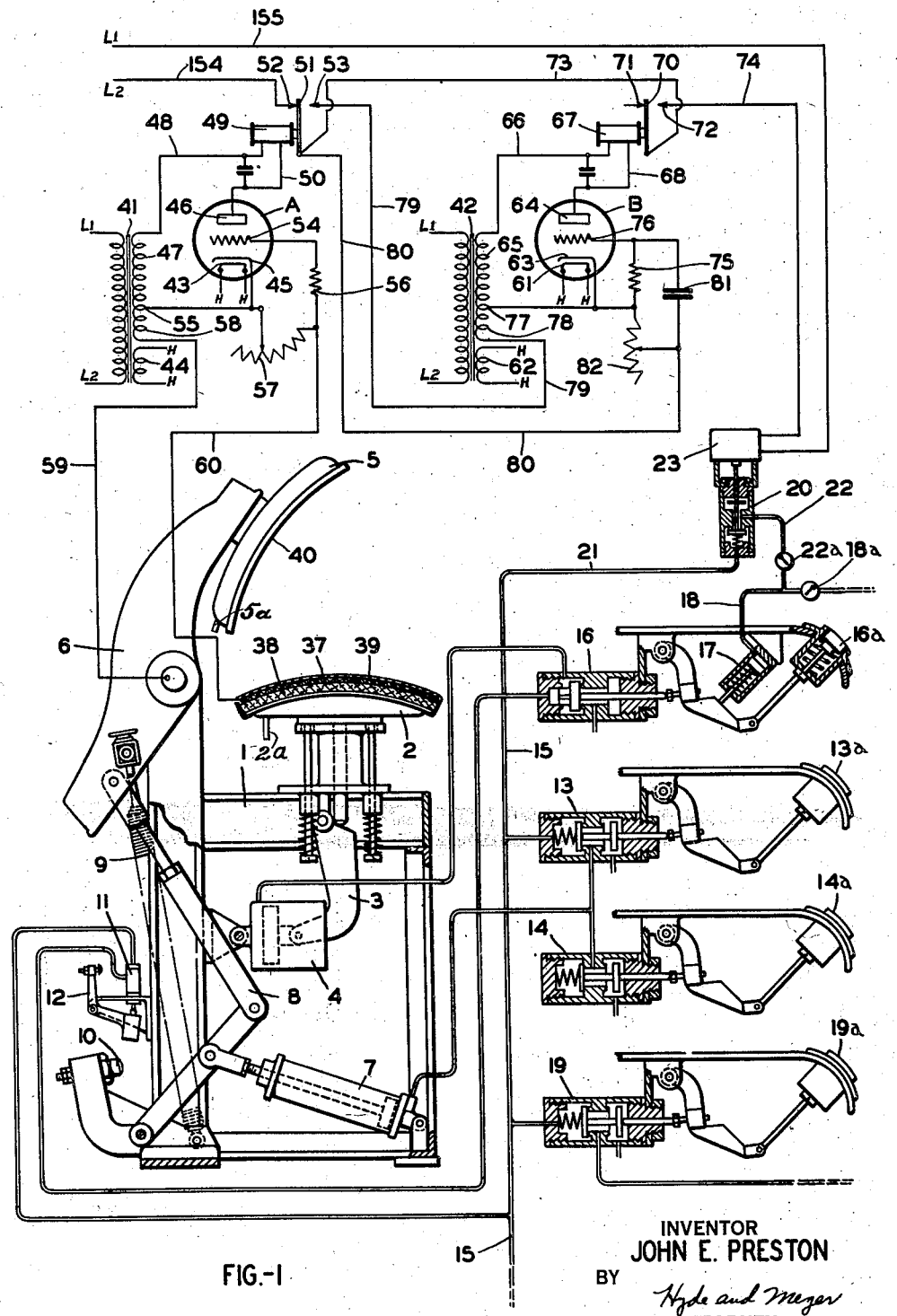
Fig. 1 illustrates, partly diagrammatically and partly schematically, a moisture sensitive electronic control for an ironing machine as used in conjunction with an electronic time delay relay for preventing further application of pressure for a fixed period after it has opened.
Figure 2:
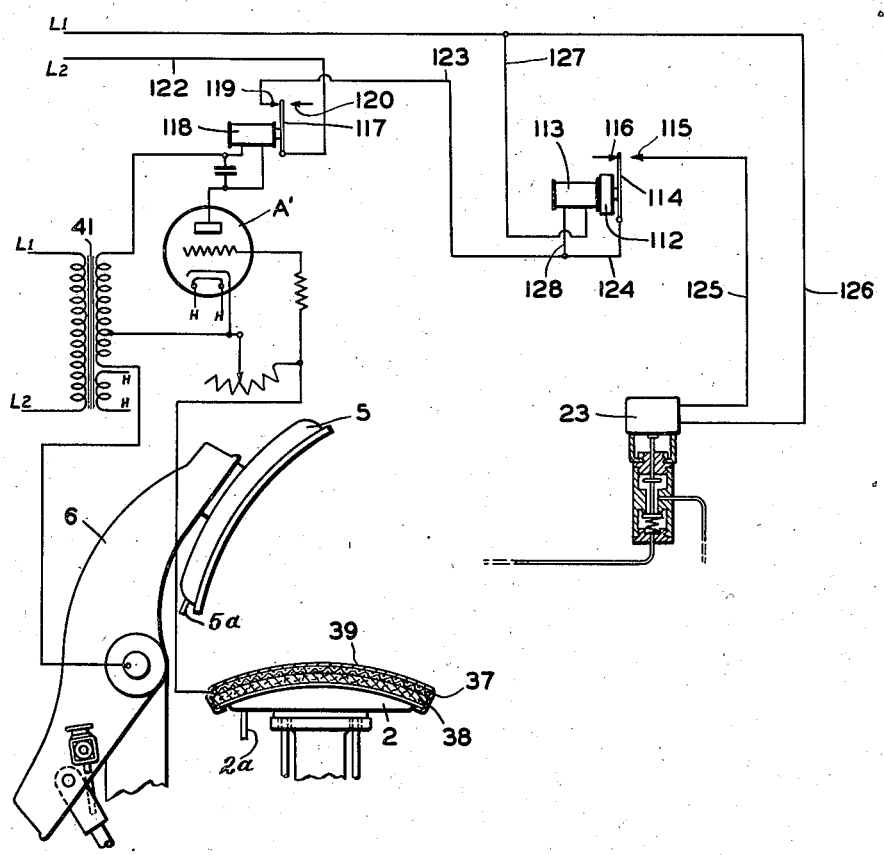
Fig. 2 is a view generally similar to Fig. 1, some of the fluid pressure mechanism and related mechanical elements being omitted because similar to those illustrated in Fig. 1, but showing the substitution of a time delay mechanical relay for the electronic time delay relay of Fig. 1.
Figure 3:
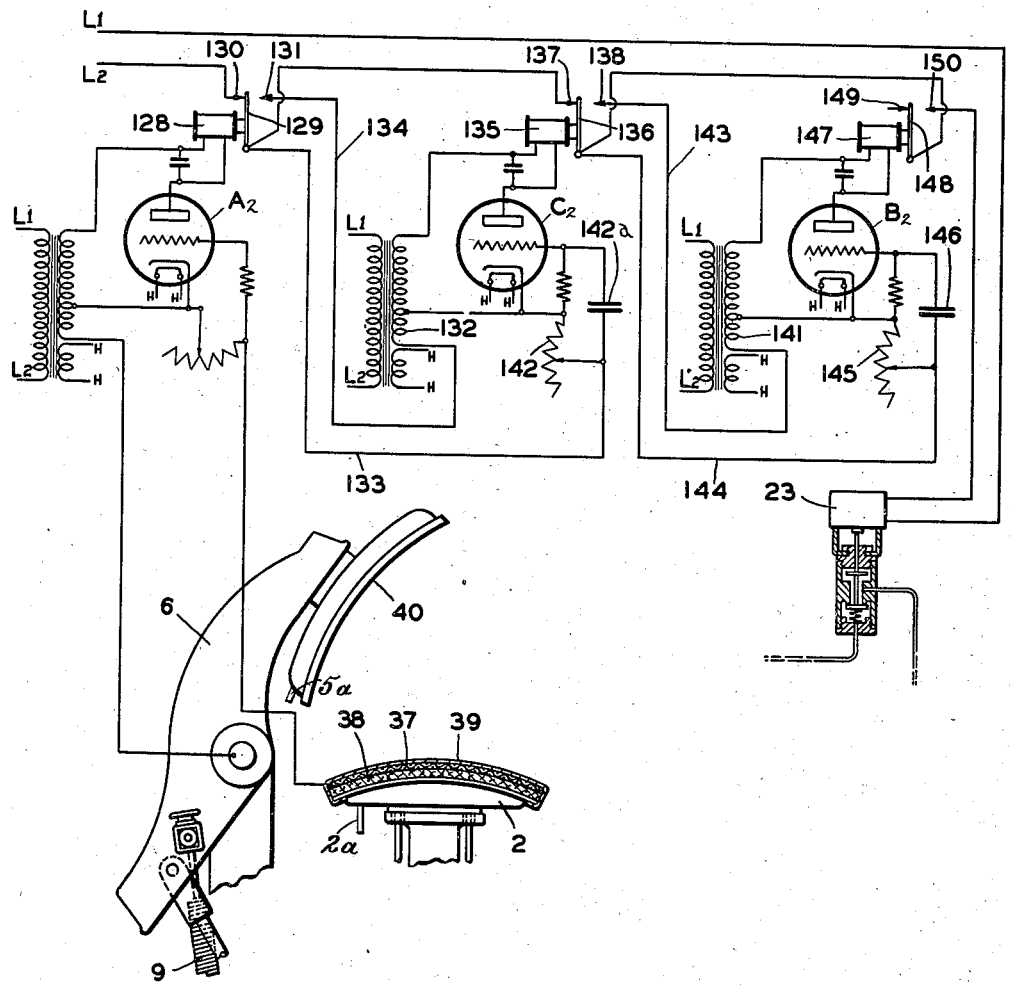

Fig. 3 is a view generally similar to Fig. 1, some of the fluid pressure mechanism and related mechanical elements of Fig. 1 being omitted, and illustrating diagrammatically the use of an additional time delay electronic relay which functions in chronological sequence between the operation of the moisture sensitive control and the relay control for preventing further application of pressure as shown in Figs. 1 and 2.

For convenience, and to promote a clearer understanding of the application of the invention to a conventional ironing press I shall first describe the operation of my moisture sensitive control as used to automatically control the time of opening of the press when the moisture content of the work has been reduced to a predetermined value, as determined by the reduction in electrical conductivity of the work. Although this control unit alone may be used in conjunction with any form of manual or other nonautomatic control devices, I prefer to use it, as shown in Figs. 1 and 2, in conjunction with automatic control means for delaying the next pressure application for any desired period after the press has been opened by the aforesaid moisture sensitive control. This automatic control for convenience may be termed the press closing control, because it predetermines the requisites for press closing operation.

Although any suitable forms thereof may be employed, for convenience I have shown but two embodiments, one an electronic relay control as shown in Fig. 1, and the other an electro-mechanical time delay device illustrated in Fig. 2. In conjunction with the moisture sensitive control, as shown in all drawings, I have illustrated and will later describe adjustable means for presetting the moisture sensitive control to operate at any desired moisture content, and also additional adjustable control means for presetting the pressure producing control to operate after the lapse of any desired interval within a practical range.

I shall finally describe, in conjunction with Fig. 3, a control element for interposing a desired time delay which postpones, for a set time, the opening of the press after the predetermined moisture condition is achieved. The manner of operation of this control element, in interposing an additive time increment to the ordinary ironing time, is not essentially different from the operation of the relay which controls delay of the next pressure application, but it will be specifically described as a separate embodiment of the invention since it varies somewhat in detail from the aforesaid pressure delay control, and since it may be used in addition to, or irrespective of the presence of the pressure delay control.

Further, it will be obvious to those skilled in the art that certain of the automatic operations now to be described may be interrupted or augmented by suitable manual controls at certain points in the operating cycle, which manual controls may be substituted for one or more of the more or less automatic controls aforementioned.

The moisture-sensitive control

The essential attribute of a moisture-sensitive control for a machine which presses, irons, or otherwise dries moisture-containing materials, such as moist fabrics in a laundry, is that some phase of the drying operation shall be controlled with some relation to variation in the moisture content of the work. One operation suitable for such control is the termination of the drying operation, thereby to enable the moisture content of the work to be reduced to a desirable value. This may be accomplished in various ways. For example, opening of the press or termination of the drying operation may be controlled by some device sensitive to the diminishing weight of the moisture-containing work. Such an arrangement might be entirely mechanical. In the arrangements shown in the drawings, however, I make some part or phase of the drying operation, such as the time of termination thereof, sensitive to variation in electrical conductivity of the work as the result of reduction of its moisture content, and that arrangement will now be described in detail.

Referring now to Fig. 1, the drawings illustrate an ironing press equipped with an electronic tube A, said tube having associated therewith the conventional plate and grid circuits later discussed in some detail. The moisture content of the article being ironed or pressed is employed to affect the grid bias of the tube, so that when the article reaches a desired end point as determined by its residual moisture content, and its consequent electrical conductivity, the grid bias passes beyond a critical point in its effect upon the plate circuit, generally termed the space current cutoff point, and the plate circuit thereupon operates a relay to cause the press to open. This can be accomplished either by energization or by deenergization of the relay.

In application to the embodiment herein shown, which is intended to be illustrative merely and not limiting, when the press is open and the ironing operation is ready to begin, the tube A is in normal operating condition and the grid is biased in the usual manner to pass sufficient current to maintain a relay in closed condition. When the press is closed on a wet article, the moist material, being a partial conductor of electricity, serves as a circuit closer to superimpose additional potential upon the grid, as will appear, so as to overbias the grid and block the flow of plate current, thereby permitting the aforesaid relay to open. When the article dries to a certain predetermined critical value of moisture, the material ceases to conduct sufficient current, and the grid potential is restored to normal operating bias, and the tube once more passes sufficient plate current to close the relay. As will hereinafter appear, the fluid pressure operating mechanism thereupon automatically opens the press.

In Fig. 1 a device is illustrated wherein an additional electronic tube B serves as an element in the relay and performs a further function in time control.

In Fig. 2 this latter relay is of an electro-magnetic type associated with a mechanical, delayed action timer, which also performs the aforesaid further function.

To illustrate the use of the moisture-sensitive control, I have schematically shown, in Fig. 1, a fairly conventional ironing press equipped with an electronic control system. The press shown may be operated or controlled individually or may be one of an assembly of two or more presses coupled for tandem or related control, in the usual manner. The drawings show a press equipped for tandem operation.

The press shown comprises a suitable frame 1, on which is mounted for vertical movement a padded work supporting bed 2 actuated through a pivoted lever 3 by a suitable pressure producing servo motor 4 operated by fluid pressure, such as air pressure.

Cooperating with the bed is a smooth-surfaced metal pressing head 5 suitably mounted for movement toward and from the bed, such as by being supported upon one arm of a pivoted head lever 6. Either the head or the bed, or both thereof, may be heated, as by steam circulated through the usual heated chambers thereof by way of pipes 2a, 5a or other means may be provided for evaporating moisture in the fabric. The head is operated by a press-closing servo motor 7, the piston rod of which is connected to the usual toggles 8, the head lever being also sensitive to the usual head opening springs 9; 10 indicates a yielding shock absorber, limiting motion of the toggle members, during press closing movement, to a position slightly beyond dead center, and serving to kick the toggles back across dead center to initiate press opening movement.

11 is a normally closed valve in the fluid pressure supply line to the servo motor 4, said valve being opened by a lever 12 actuated by the toggles 8 when the head reaches closed position.

The press is controlled by the usual manuals, including two combination inlet and exhaust valves in series, marked respectively 13, 14, actuated by manuals 13a, 14a and controlling the flow of fluid pressure from the supply line 15 to, and the exhaust from, the press closing servo motor 7.

When the press has been closed, and the head is in pressing relation with the bed, powerful pressure is produced between the pressing members by the servo motor 4, pressure flowing to it from the supply line 15 by way of valve 11 and the usual release or press opening valve 16. Said release valve may be operated either manually, by the usual manual 16a, operation of which evacuates the servo motor 4 and enables the shock absorber 10 and springs 9 to open the press, or automatically by the servo motor 17.

Said servo motor 17 is the one usually employed for tandem control, by coupling its supply line 18 to the tandem valve 19 of a neighboring press, valve 19 being operated by the usual manual 19a.

The press operating and control parts so far described are all of usual form and well known and require no further description.

According to the present invention I supplement the press operating and control parts so far described by means associated with the press mechanism and control parts at two points, to-wit:

(a) An electrical circuit is associated with the pressing members to be sensitive to variations in the moisture content and electrical conductivity of the work being pressed between them, and (b) The electrical system, so sensitive to moisture and conductivity, is so arranged as to produce a controlling effect, as by an electro-magnetic coil 23, upon a normally closed fluid pressure supply valve 20 connected by the pipe 21 to the fluid pressure source 15, and controlling the flow of pressure by way of pipe 22 to the pipe 18 supplying pressure to the servo motor 17.

18a and 22a respectively represent check valves, seating away from the servo motor 17 in the pipes 18 and 22, and preventing back flow therethrough.

Buck 2 carries thereon a sheet of wire gauze 37 which may have any suitable area, but is shown as substantially coextensive with the working area of the buck. This gauze is insulated from the buck by the usual pad 38 and is conductively electrically connected to wire 60. On top of the wire gauze is the usual muslin layer 39. When a moist article is placed on the buck and the head and buck are pressed together, the muslin layer absorbs sufficient moisture from the article to permit electric current to pass from wire 59 to the machine frame and the metal of the head 5 to the wire gauze 37 as part of a grid circuit to be described hereinbelow.

I have diagrammatically shown in duplicate, for simplicity in illustrating and describing the cooperating electronic tube circuits, two transformers 41 and 42. It should be understood, however, that in practice a single transformer serves the double function here illustrated, and the triple function later described with reference to Fig. 3.

Line voltage of the alternating current type is supplied at $L_1$ and $L_2$ for the primary winding. Tube A is a standard three element AC electronic tube of the separate heater type; the heating filament 43 is supplied with current from secondary winding 44 of transformer 41, so as to heat cathode 45 to the electron emission range. For simplicity the complete filament circuit is not shown. The circuit for the plate 46 is supplied with current from secondary winding 47 of transformer 41, and includes lead wire 48, relay 49 and lead wire 50. When relay coil 49 is energized by a plate current of sufficient strength it draws armature 51 into engagement with contact point 52 against the action of a spring (not shown) or against gravity so as to break contact with point 53, thereby affecting further circuits including line lead wires 154 and 155 as later described.

Grid 54 of tube A is biased with respect to the cathode 45 and terminal 55 of the plate circuit by means of a standard voltage-drop grid-bias resistor 56 and I have provided for the grid circuit an additional variable resistor 57 which supplements the effect of resistor 56 with respect to its biasing characteristics so that by adjustment of the resistor 57 the space current cut-off point of the tube may be varied over a range depending on the operating characteristics of the tube and the voltage drop of the active portion of resistor 57.

A supplementary grid bias may be imposed on the grid from secondary winding 58 through conductor 59, press head 40, wire gauze 37, conductor 60 and resistor 56 when the press is closed and the circuit just described is completed through the wet article. The potential developed in this circuit and originating at secondary 58 is sufficient to definitely unbalance the grid bias to cut-off position, the plate current is interrupted and armature 51 of relay 49 moves into contact with point 53. This condition is maintained until the article dries to the point where the grid current in the supplemental grid circuit drops past grid cut-off value, at which time the supplemental grid circuit is interrupted, the tube passes plate current normally (as prearranged by the setting of resistor 57), the relay 49 is energized, and the armature 51 returns to contact with point 52.

It will be apparent to those skilled in the art that the cut-off point in the valving effect of tube A is adjustable by resistor 57 so that the overbiasing characteristics of the supplemental grid circuit will terminate at any desired moisture content of the work, in accordance with a predetermined plan. A few trials will be sufficient to teach the operator the proper setting of the variable resistor 57 for any desired moisture and point at which plate current will again energize the relay, or, the resistor may be calibrated and a suitable scale and indicator may be provided therefor.

The device so far described may be utilized to perform any desirable operation of the ironing device, such as, for example, the opening of the press, when plate current again begins to flow, through the medium of any desired circuit associated with relay 49, which may be directly effective upon the magnet coil 23. I prefer, however, to use the moisture sensitive electronic control just described in conjunction with an additional time delay relay which operates automatically to prevent another application of pressure pending the lapse of a predetermined periol after the press has been opened.

*Electronic control of next pressure application*

While solenoid 23 is energized, valve 20 supplies pressure from the service line 21 by way of pipes 22 and 18 to servomotor 17, which opens and holds open valve 16, through which servomotor 4 is now open to exhaust, and hence, is ineffective. Consequently, even if the manuals 13a, 14a are depressed, no pressure can build up in motor 4 and application of pressure by means of buck 2 is prevented. The purpose of control tube B and its associated circuits is to maintain solenoid 23 in energized condition, whereby servomotor 4 remains open to exhaust for a predetermined and controlled interval, during which interval pressure may not be applied to the press. In brief, and before describing this additional feature in detail, I have provided means for controlling the operating characteristics of tube B, in conjunction with the operation of relay 49 described above, so that when tube A begins to pass plate current after the article is dry and the press is open, tube B will assume temporary control and prevent the closing of the press during the period of said temporary control. The device operates as follows:

The filament 61 of tube B, which may be a standard three element separate heater AC tube similar to tube A, is heated from a secondary winding 62 of transformer 42. As heretofore explained, transformers 42 and 41 may be identical, but are separately illustrated for convenience and simplicity. Filament 61 heats cathode 63 to the electron emission range. The operating circuit of plate 64 is energized from secondary winding 65 and includes conductor 66, relay coil 67, and conductor 68. When the tube B is passing plate current the coil 67 is energized and applies armature 70 to contact 71 against the action of a spring (not shown). When plate current is interrupted and coil 67 is deenergized the armature snaps to contact 72, thereby making a connection between conductors 73 and 74. In normal operation, when the tube B is passing plate current, the grid circuit includes a voltage-drop, grid-bias resistor 75 which biases grid 76 with respect to the cathode 63 and the plate circuit terminal 77 in manner understood by those skilled in the art.

When tube A is not passing plate current and armature 51 makes contact at point 53 as already described, a supplementary grid circuit is set up for tube B as follows. A potential originating at secondary winding 78 is impressed on grid 76 through conductor 79, point 53, armature 51, conductor 80, and, in parallel, variable resistor 82 and condenser 81. The effect of this materially increased potential is to overbias grid 76 to the point where it interrupts the flow of plate current in tube B so that relay 67 is deenergized and armature 70 makes contact with point 72.

As is well known to those skilled in the art, the passage of current from a heated cathode to a colder grid or plate is unidirectional, and only half of the alternating current wave originating at 78 traverses the supplementary circuit just explained, the tube operating as a rectifier with regard to said grid circuit (and, incidentally, said plate circuit), and while said grid circuit is so energized the condenser 81 accumulates a charge by reason of the unidirectional flow, the magnitude of which charge depends on the capacity of the condenser. As soon as this supplementary grid circuit is broken at 53 by reenergization of relay coil 49, tube B will not immediately function normally in passing plate current, because condenser 81 begins to discharge into the original grid circuit the accumulated potential built up during operation of the supplementary circuit. The period of this discharge is determined by a number of factors involving the resistance, inductance, and capacity of the circuit, but in the absence of variable resistor 82 the discharge period would be of very short duration. By introducing this adjustable, high resistance element into the circuit the condenser discharge may be delayed over a period of as much as several minutes. For my purpose, the significant effect is that the discharge unbalances the grid bias sufficiently to block passage of plate current until the condenser 81 has returned practically to neutral condition. In normal operation of the tube, resistor 82 and condenser 81 are shorted out of the grid circuit, the supplementary grid circuit of tube B being open at point 53.

By thus utilizing the functional characteristics of tube B to charge condenser 81 during the operation of the supplementary grid circuit and thereafter to discharge it, I have succeeded in supplying a simple, effective, and adjustable control of the time interval during which the press is maintained in open position, as will now appear.

The opening of the press is dependent upon the opening of valve 20 by solenoid 23. When this occurs fluid pressure passes from line 22 through check valve 22a and conduit 18 into servomotor 17, which operates to open the press release valve 16.

Opening of valve 16, as previously indicated, permits motor 4 to exhaust and pressure application on buck 2 ceases. Motor 7 is open to exhaust at valves 13, 14, because the hands have been removed from the manuals 13a, 14a. The yielding shock absorber 10 then kicks toggles 8 slightly past dead center so as to permit springs 9 to initiate and complete press opening movement.

The complete sequence of operations of the control device shown in Fig. 1 is as follows, correlating the functions already described for the various elements. Starting with the press in open position, an article to be laundered is laid on the buck and the press is closed by simultaneous operation of manuals 13a, 14a. A circuit is thereupon completed through the moist article and the excess grid bias of tube A interrupts the plate current, deenergizing coil 49 and allowing armature 51 to make contact at point 53. This completes a supplementary circuit for the grid of tube B blocking plate current in tube B and charging condenser 81. Coil 67 is deenergized and armature 70 makes contact at 72. The circuit for solenoid 23 is still open at 52.

When the article in the press arrives at the desired moisture content, as determined by variable resistor 57, the supplementary grid circuit of tube A is broken at the press since the dry material no longer acts as a conductor and the normal grid bias is restored, permitting the tube A to pass plate current and energizing relay 49 which causes armature 51 to make contact at 52. The solenoid circuit is now closed through conductor 155, solenoid 23, conductor 74, armature 70, conductor 73, armature 51 and conductor 154, and operation of the energized solenoid permits exhaust of motor 4 and thereby causes the press to open as above described.

Although the breaking of the supplementary circuit for the grid of tube B at contact 53 has a tendency to restore normal operating bias to grid 76 of tube B, this tendency is deferred for an interval required to fully discharge condenser 81 as controlled by the setting of rheostat 82. When the condenser 81 is discharged to the point where the bias of grid 76 is approximately normal, tube B again passes plate current and armature 70 breaks the solenoid circuit at 72. Solenoid 23 is thereupon deenergized closing motor 4 to exhaust and permitting the subsequent closing of the press and initiation of pressure by manuals 13a and 14a as aforesaid.

*Time delay relay for press closing control*

Instead of using an electronic tube as a control element in a press closing control unit, such control being effected by tube B in Fig. 1, I may substitute for tube B a standard electro-mechanical time delay relay unit procurable commercially, and shown in Fig. 2 at 112. This unit is attached to the electro-magnetic relay coil 113 and, as is understood by those skilled in the art, the delay mechanism resists return of armature 114 from contact 115 to contact 116 when coil 113 is re-energized after an inactive period. The device is operated as follows, referring to Fig. 2.

Tube A' functions as a moisture sensitive electronic control, exactly as did tube A in Fig. 1. When tube A' is normally passing current, and before a wet article is placed in the press, coil 118 is energized and the armature 117 of coil 118 makes contact at 119 but the line circuit for solenoid 23 (which controls press opening) is open at point 115. When the press is closed on a wet article the grid of tube A' is overbiased, as previously described for tube A, plate current is interrupted, relay 118 is de-energized, and armature 117 contacts point 120. This interrupts the line current to coil 113 at 119, coil 113 is de-energized, and armature 114 makes contact at 115. The line circuit for solenoid 23 is now closed at 115 but open at 119. When the article on the buck dries, and tube A' again passes plate current so as to energize coil 118, armature 117 makes contact at 119 and the line circuit to solenoid 23 is now completed, as follows: from the line L2 through conductor 122, armature 117, contact 119, conductor 123, conductor 124, armature 114, contact 115, conductor 125, solenoid 23, and conductor 126 back to L1. The solenoid 23, being energized, causes the press to open as previously described. Although coil 113 is now energized because connected in parallel across the live circuit, enumerated in the last sentence, by means of conductors 127 and 128, the time delay mechanism 112 prevents return of the armature 114 to contact 116 for a period determined by the setting of the timer, and the solenoid 23 is therefore maintained in energized condition until the timer 112 permits armature 114 to break the solenoid circuit at 115. As heretofore explained, the press cannot be closed while the solenoid 23 remains in energized condition.

*Additive time delay before press opening*

Fig. 3 illustrates diagrammatically a control for an ironing press comprising, in combination, three tubes A2, B2 and C2. Tubes A2 and B2 operate exactly as explained with reference to tubes A and B respectively of Fig. 1, although the chronological sequence of their operation is interrupted, for a set period, by the interposition therebetween of tube C2, the purpose of which is to delay the actual press opening for a desired additional period, after the article being ironed is dry. The hookup operates as follows.

As already explained, with reference to Figs. 1 and 2 and tubes A and A1, when a wet article is pressed between the head and buck, tube A2 passes no plate current by reason of the overbiasing of its grid and the armature 129 makes contact at 131. This permits an overbiasing potential to be impressed on the grid of C2 through secondary 132, conductor 134, contact 131, armature 129, conductor 133, variable resistor 142 and condenser 142a. Tube C2 is blocked and passes no plate curent to relay 135 but charges condenser 142a. Armature 136 makes contact at 138 since coil 135 is deenergized. The line circuit to the solenoid 23 is now open at points 130, 137 and 150.

When armature 136 makes contact at 138 an overbiasing potential from secondary 141 is impressed on the grid of tube B2 through conductor 143, contact 138, armature 136, conductor 144, and, in parallel, variable resistor 145 and condenser 146. The condenser 146 begins to acquire a charge, and plate current through coil 147 is interrupted, permitting armature 148 to make contact at 150. The solenoid circuit is now open at points 130 and 137. The cessation of plate current in tubes A₂, C₂ and B₂ on closing of the press takes place practically instantaneously in the order given.

When the ironed article dries, the grid bias of tube A₂ returns to normal, coil 128 is energized by the flow of plate current and armature 129 makes contact at 130. The solenoid circuit is still open at 138.

The supplementary grid biasing circuit of tube C₂ is now broken at 131. Tube C₂ however does not begin to pass plate current until the condenser 142a is completely discharged, the interval being determined by the setting of variable resistor 142. At the end of said interval, which constitutes the additive time interval comprehended by this embodiment of my invention, tube C₂ again passes plate current, coil 135 is again energized, and armature 136 again makes contact with point 137. At this moment the circuit for solenoid 23 is closed at 130, 137, and 150, and the press opens as previously described, having been delayed beyond the normal opening point by an increment of time determined by the discharge of condenser 142a as controlled by variable resistor 142.

The re-energization of coil 135 breaks the supplementary grid circuit of tube B₂ at 138, but tube B₂ does not begin to pass plate current until condenser 146 discharges through variable resistor 145, the delay being measured and controlled by the setting of the variable resistor as heretofore fully discussed. While condenser 146 discharges the tube is blocked and the solenoid circuit remains closed since armature 148 contacts point 150, and, since tubes A₂ and C₂ are now normally passing plate current, contact is also made by armatures 129 and 136 at points 130 and 137 respectively. While the solenoid circuit is thus closed, no pressure can be applied by means of buck 2.

As soon as condenser 146 discharges to the point where it no longer materially affects the grid bias of tube B₂, the tube begins to pass plate current, the relay 147 is reenergized, armature 148 breaks contact at 150 opening the circuit for solenoid 23 and prmitting the press to be closed, if desired, by further operation of the manual controls, as previously described.

It is apparent from the foregoing description that I have provided control means applicable to apparatus for drying moist fabrics, as exemplified for instance by an ironing or drying press, wherein the work is pressed between relatively movable members. The drying apparatus has operating means controlled by a device which is sensitive to the moisture content of the work and which effects the termination of the press-drying operation when the predetermined critical moisture content is reached. As an example of such a moisture sensitive control device I have described an electronic tube and associated circuits having suitable operative devices energized thereby.

An important function of this moisture sensitive control means is to open a press as described, but said control may be readily adapted to be used in combination with further control means for preventing further application of pressure for a predetermined period, which further control means I have conveniently termed a press closing control and which may take various forms, of which I have described two, either of which may be used, namely a unit based on an electronic tube and associated circuits and a further unit based on an electro-magnetic relay operatively associated with a mechanical timing device.

I have further disclosed means for interposing an adjustable period of delay, after the normal completion of function of the moisture sensitive device, so as to postpone opening of the press untill after said period has elapsed, and this further means, illustrated in one embodiment as an electronic tube with associated circuits having suitable operative devices energized thereby, I have termed an additive time delay control unit.

I have illustrated and described adjustable means for varying the sensitivity of the moisture sensitive control device so as to render it capable of reacting to terminate a time cycle at any predetermined amount of residual moisture. I have further provided convenient adjustable means, applicable to the described press closing control and the additive time control, and, if desired, to the electronic moisture sensitive control whereby the length of respective time cycles determined thereby are under the control of the operator and may be preset to take place automatically. As an example of this adjustable control I have shown a condenser which is charged by a supplementary grid circuit in one period of a time cycle, and which thereafter controls a subsequent period of the time cycle by a restrained discharge when the supplementary grid circuit is broken.

Although in the present specification and the accompanying drawings I have described and illustrated an electronic tube of the three-element, separate heater, alternating current type, the elements consisting of the familiar cathode, grid, and plate, it is quite apparent that electron emission tubes of a variety of types may be readily adapted to function in a manner equivalent to that described. The type shown was chosen for simplicity in illustration and description. Certain gas filled four-element tubes may be found quite suitable since the passage of space current is facilitated by gas ionization and, in the ionized condition, the space current cut-off point is quite sharp, as compared to a somewhat indefinite "twilight zone" encountered in the vacuum type electron tube when the tube is functioning in the neighborhood of critical cut-off bias.

The embodiments disclosed are exemplary of the inventive concepts, and are presented for illustration and not limitation.

What I claim is:

1. Apparatus for drying moist fabrics, comprising relatively movable pressing members between which the work may be pressed, operating means for advancing said members toward each other into pressing relation with the work, means for evaporating moisture in the fabric, means sensitive to variations in the electrical conductivity of the work for separating said members to thereby terminate the pressing operation, and further means for preventing further pressure contact between said members for a predetermined period after said separation.

2. Apparatus for drying moist fabrics, comprising relatively movable pressing members between which the work may be pressed, operating means for causing relative movement of said members toward each other into pressing relation with the work, at least one of said members being heated, means for controlling the pressing operation including a first electronic tube, the aforesaid relatively movable pressing members constituting cooperating electrodes in a grid circuit for said tube, said grid circuit being sensitive to the moisture content of the work interposed between said pressing members, means in a plate circuit of said first tube and thereby operatively responsive to said grid circuit for causing separation of said pressing members, said controlling means further including a second electronic tube, a grid circuit in said second tube operatively responsive to variations in current flow in said plate circuit in said first tube, adjustable means for varying the grid response of said second tube, a plate circuit for said second tube, and means energized by said last named plate circuit for preventing re-engagement of said pressing members for a predetermined time after said pressing members have been separated.

3. Apparatus for drying moist fabrics, comprising relatively movable pressing members between which the work may be pressed, operating means for causing relative movement of said members toward and from each other for the pressing operation, means for evaporating moisture in the fabric when said pressing members are in pressing relation, control means for said operating means, comprising an electronic tube having its grid circuit provided with means arranged to conductively include the work when the press is closed, said circuit thereby being sensitive to variations in the electrical conductivity of the work for varying the circuit potential as the moisture content of the work is reduced, and also having its plate circuit effectively associated with said operating means for separating said members to terminate the pressing operation, and further time controlled means for preventing further pressure contact between said members for a predetermined period after their separation.

4. Apparatus for drying moist fabrics, comprising relatively movable pressing members between which the work may be pressed, operating means for causing relative movement of said members toward and from each other for the pressing operation, means for evaporating moisture from the work between said pressing members when they are in pressing relation, and control means for said operating means, comprising an electronic tube having its grid circuit provided with means arranged to conductively include the work when the press is closed, said circuit thereby being sensitive to variations in the electrical conductivity of the work for varying the circuit potential as the moisture content of the work is reduced, said tube also having its plate circuit effectively associated with said operating means for causing separation of said members to terminate the pressing operation, and additional control means, comprising a timing device, and a second electronic tube having its grid circuit operatively associated with said timing device and with the plate circuit of said first named tube to be affected thereby and its plate circuit effectively associated with said operating means for preventing further relative movement of said members into pressing relation for a predetermined period after their separation.

5. Apparatus for drying moist fabrics, comprising relatively movable pressing members between which the work may be pressed, operating means for causing relative movement of said members toward and from each other for the pressing operation, means for evaporating moisture from the work between said pressing members when in pressing relation, control means for said operating means comprising an electronic tube having one circuit provided with means sensitive to the electrical conductivity of the work and another circuit effectively associated with said operating means for separating said pressing members to terminate the pressing operation, and further control means comprising an electromagnetic relay operatively associated with said other circuit of said tube to be affected thereby, and also having a controlling time delay device operatively associated therewith and with said operating means for preventing further engagement of said members in pressing relation for a predetermined period after their separation.

6. Apparatus for drying moist fabrics, comprising relatively movable pressing members between which the work may be pressed, operating means for causing relative movement of said members toward and from each other for the pressing operation, means for evaporating moisture in the fabric between said members when in pressing relation, timing relay means, and control means therefor, comprising an electronic tube having its grid circuit provided with means arranged to conductively include the work when the press is closed, said circuit thereby being sensitive to variations in the electrical conductivity of the work for varying the circuit potential as the moisture content of the work is reduced, and having its plate circuit effectively associated with both said operating means and said relay means for initiating operation of said relay means, means operatively connecting said relay means with said operating means for separating said members at the expiration of the timing period, and further means for preventing further engagement of said members in pressing relation for a predetermined period after said separation.

7. Apparatus for drying moist fabrics, comprising relatively movable pressing members between which the work may be pressed, operating means for causing relative movement of said members toward and from each other for the pressing operation, means for evaporating moisture in the fabric between said pressing members when in pressing relation, timing relay means, and control means therefor, comprising an electronic tube having its grid circuit provided with means arranged to conductively include the work when the press is closed, said circuit thereby being sensitive to variations in the electrical conductivity of the work for varying the circuit potential as the moisture content of the work is reduced, and having its plate circuit effectively associated with both said operating means and said relay means for initiating operation of said relay means, said relay means including a second electronic tube having its grid circuit operatively linked with the plate circuit of the first named tube, means operatively associating the second named tube with said operating means for separating said members at the expiration of said timing period, and further means for preventing further engagement of said members in pressing relation for a predetermined period after their separation.

8. Apparatus for drying moist fabrics, comprising relatively movable pressing members between which the work may be pressed, operating means for causing relative movement of said members toward and from each other for the pressing operation, means for evaporating moisture in the fabric between said pressing members when in pressing relation, timing relay means, and control means therefor, comprising an electronic tube having its grid circuit provided with means arranged to conductively include the work when the press is closed, said circuit thereby being sensitive to variations in the electrical conductivity of the work for varying the circuit potential as the moisture content of the work is reduced, and having its plate circuit effectively associated with both said operating means and said relay means for initiating operation of said relay means, said relay means including a second electronic tube having its grid circuit operatively linked with the plate circuit of the first named tube, means operatively associating the second named tube with said operating means for separating said members at the expiration of said timing period, and further control means, comprising a time controlled third electronic tube, and means operatively associating the same with said first named control means and said timing relay means for preventing further engagement of said members in pressing relation for a predetermined period after their separation.

9. Apparatus for drying moist fabrics, comprising relatively movable pressing members between which the work may be pressed, operating means therefor, means for evaporating moisture in the fabric when said members are in pressing relation, control means sensitive to the electrical conductivity of the work and actuated upon predetermined drying thereof, additional time controlled delay means operatively associated with said operating means for terminating the pressing operation, and means actuated by and upon actuation of said control means for initiating operation of said time controlled delay means.

10. Apparatus for drying moist fabrics, comprising relatively movable pressing members between which the work may be pressed, operating means therefor, means for evaporating moisture in the fabric when said pressing members are in pressing relation, and control means for said operating means, comprising manually operated means effective upon said operating means for causing relative pressing approach of said pressing members, means sensitive to variations in the moisture content of the work and operatively associated with said operating means and arranged when actuated to cause separation of said members, and time controlled means also operatively associated with said operating means and effective upon said manually operated means to prevent movement of said members toward each other for a predetermined period after their separation.

11. Apparatus for drying moist fabrics, comprising relatively movable pressing members between which the work may be pressed, operating means therefor, means for evaporating moisture in the fabric when said pressing members are in pressing relation, and control means for said operating means, comprising manually operated means effective upon said operating means for causing relative pressing approach of said pressing members, primary means sensitive to variations in the moisture content of the work and operatively associated with said operating means and arranged when actuated to cause separation of said members, secondary time controlled means also operatively associated with said operating means and effective upon said manually operated means to prevent movement of said members toward each other for a predetermined period after their separation, and means operated by said primary means for initiating operation of said secondary means.

12. Apparatus for drying moist fabrics, comprising drying means, operating means for effecting association of the drying means with the work, control means sensitive to the electrical conductivity of the work and operative upon predetermined drying thereof, and normally inoperative time delay means actuated by and upon operation of said control means and operatively associated with said operating means to terminate the drying operation.

JOHN E. PRESTON.